United States Patent

Mitsuda et al.

Patent Number: 5,892,982
Date of Patent: Apr. 6, 1999

[54] EXTERNAL EXPANSION BUS INTERFACE CIRCUIT FOR CONNECTING A MICRO CONTROL UNIT, AND A DIGITAL RECORDING AND REPRODUCING APPARATUS INCORPORATING SAID INTERFACE CIRCUIT

[75] Inventors: Makoto Mitsuda; Akihiko Nakamura; Katsuyuki Tamai; Masao Okabe; Tsutomu Miyoshi; Masafumi Sato, all of Osaka-fu; Junji Soga, Kyoto-fu, all of Japan

[73] Assignee: Matsushita Electric Industrial Co., Ltd., Osaka-fu, Japan

[21] Appl. No.: 757,280

[22] Filed: Nov. 27, 1996

[30] Foreign Application Priority Data

Nov. 29, 1995 [JP] Japan ................................. 7-310477
Jan. 17, 1996 [JP] Japan ................................. 8-005370
Jan. 29, 1996 [JP] Japan ................................. 8-012392

[51] Int. Cl.$^6$ ....................................... G06F 15/02
[52] U.S. Cl. ................................... 395/882; 395/309
[58] Field of Search ....................... 395/821, 822, 395/882, 883, 309; 365/189.04, 189.05, 189.06, 189.07, 233, 230.02, 230.08, 230.03

[56] References Cited

U.S. PATENT DOCUMENTS

| | | | |
|---|---|---|---|
| 4,899,310 | 2/1990 | Baba et al. | 365/189.05 |
| 4,933,879 | 6/1990 | Ando et al. | 345/513 |
| 4,951,258 | 8/1990 | Uehara | 365/222 |
| 4,989,182 | 1/1991 | Mochizuki et al. | 365/210 |
| 5,260,904 | 11/1993 | Miyawaki et al. | 365/189.06 |

OTHER PUBLICATIONS

M. Okabe et al., entitled "The Development of Audio and Video Signal Processing LSI for SD–DVC," published in IEEE Transactions on Consumer Electronics, vol. 41, No. Aug. 1995, pp. 672–678.

Copy of a German examination report (along with an English translation) mailed on Mar. 20, 1998 in German counterpart application No. 196 49 075.8–53.

Pp. 48 and 49 (Section 3.4.4–80C48 CMOS Memory Interface) of a publication by Chris J. Georgopoulos entitled "Interface Fundamentals In Microprocessor–Controlled Systems", published by D. Reidel Publishing Company, 1985.

*Primary Examiner*—Moustafa M. Meky
*Attorney, Agent, or Firm*—Greenblum & Bernstein, P.L.C.

[57] ABSTRACT

An external expansion bus interface circuit is provided for connecting a peripheral to a micro control unit to exchange digital information under an external expansion memory mode of the micro control unit. For this purpose, the eternal expansion bus interface circuit includes a means for storing a writing data. Address decoder and a strobe decoder are connected to the micro control unit to directly receive the writing data, an address strobe, and a write strobe. Then the address decoder and strobe decoder produce a write enable signal for enabling the memory to store the data at address designated thereby.

2 Claims, 9 Drawing Sheets

EXTERNAL EXPANSION BUS INTERFACE CIRCUIT FOR CONNECTING A MICRO CONTROL UNIT, AND A DIGITAL RECORDING AND REPRODUCING APPARATUS INCORPORATING SAID INTERFACE CIRCUIT

BACKGROUND OF THE INVENTION

1. Field of the Invention

The present invention relates to an external expansion bus interface circuit for connecting a micro control unit under an external expansion memory mode thereof and, more particularly, to a digital recording and reproducing apparatus incorporating said interface circuit

2. Description of the Prior Art

In FIG. 7, before describing a conventional digital recording/reproducing apparatus, a map of the tape recording format used in a digital Video Cassette Recorder (VCR) to record digital video data is shown. NTSC-format (525/60 system) Digital Video (DV)-type VCRs record 10 tracks per frame with each track comprising separate blocks to which the audio data, video data, and additional subcode data are recorded. These data tracks can be recorded to and reproduced from a tape TA by a digital recording and reproducing apparatus using a helical-scan recording/reproducing rotary head. Symbols Sc, Si, Sa, Dt, and Dh in FIG. 7 indicate a subcode, video data, audio data, tape feeding direction, and head scanning direction, respectively.

In a conventional digital recording/reproducing apparatus the digital signal processing circuit is controlled by a micro control unit using serial communications over an I2C bus. Transmitting subcode data and other additional data between the micro control unit and signal processor is programmatically controlled over a dedicated bus using plural input/output terminals.

Digital recording and reproducing apparatuses that reproduce a data signal recorded to tape using diagonal tracks as shown in FIG. 7 commonly use a rotary head and helical scanning technique. Digital recording and reproducing apparatuses achieving high density recording and a compact design also use automatic track finding (ATF) control to track the rotary head to the data tracks.

This ATF control technique works by recording a pilot signal to each track together with the data signals (e.g., audio, video, and subcode signals). A low azimuth loss, relatively low frequency signal is used for this pilot signal even for azimuth recording. During recording the frequency of the pilot signal is changed every other signal.

For example, in a DV format recording the tracks may be recorded in the sequence track f0, track f1, track f0, track f2, track f0, and so on where track f0 indicates the tracks to which the pilot signal is not recorded, track f1 indicates the tracks to which a pilot signal of frequency f1 is recorded, and track f2 indicates the tracks to which a pilot signal of frequency f2 is recorded. The signal leakage of the pilot signals from the two tracks adjacent to the main scanning track is then detected during reproduction, and the signal levels are compared to detect the level difference between the two pilot signals and thereby detect the tracking error.

The structure and operation of this conventional digital recording and reproducing apparatus is described below with reference to the accompanying figures.

In FIG. 8, a first example of the conventional digital recording and reproducing apparatus is shown. This recording and reproducing apparatus RRC1 mainly includes a micro control unit (MPU) 100 and a signal processor 120.

The micro control unit 100 controls the overall system by means of an input device 111 for inputting an information DI enabling the status of the overall system to be determined, a mode discriminator 112 for determining the operating mode of the overall system based on the information input from the input device 111, a serial interface 113 for serially transferring command data by means of the I2C bus 3 connecting the micro control unit 1 with the signal processor 120, and an additional data transfer means 14 for controlling the transfer of subcode data and other additional data to the signal processor 120 via a dedicated bus 4.

The signal processor 2 performs the digital signal processing needed to record and reproduce digital audio, video, and additional data. It accomplishes this by means of a digital signal processing circuit 21 that does the actual digital recording and reproducing processing for the audio, video, and additional data; a control register 22 for storing the control data used to control the operation of the digital signal processing circuit 21; an audio/video data memory 23 for storing the audio and video data during the processing operation of the digital signal processing circuit 21; an additional data memory 24 for storing the subcode data and other additional data during the processing operation of the digital signal processing circuit 21; a serial interface circuit 25 for serially communicating control data with the micro control unit 1 over the I2C bus 3; and a dedicated bus interface circuit 26 for communicating the subcode data and other additional data with the micro control unit 1 over the dedicated bus 4.

Note that the recording/reproducing unit for recording and reproducing the digital data Sv from the digital signal processing circuit 21 to the magnetic tape TA or other medium or to a display is omitted as shown in FIG. 8 for the sake of brevity.

The conventional digital recording and reproducing apparatus RRC1 comprised as shown in FIG. 8 operates as described below.

As described above, control data is transferred between the micro control unit 1 and signal processor 2 by means of a serial data transfer operation using the I2C bus 3. The control data includes mode information output from the micro control unit 1 and indicating the VCR status, e.g., whether the VCR is reproducing or recording data, or is stopped or paused, broadcast format information output from the signal processor 2 during tape reproduction, and the audio sampling frequency.

For example, when the user operates a button from a stop mode to reproduce the program content, the input device 11 inputs the playback (reproduction) button data (signal) and the current VCR mode to the mode discriminator 12. Based on the supplied information, the mode discriminator 12 changes the operating mode and outputs the selected mode information to the serial interface 13. More specifically, the mode discriminator 12 changes the operating mode from the stop mode to the play mode, and outputs to the serial interface 13 data indicating that the tape is to be reproduced (the play mode has been selected).

The serial interface 13 then serially transfers this mode information to the signal processor 2 according to the I2C protocol. The signal processor 2 thus receives the serial data transferred via the I2C bus 3 through the serial interface circuit 25, decodes the control data, and stores the decoded result to the control register 22. The digital signal processing circuit 21 reads the control data frame by frame, and thus changes circuit operation to the reproduction (playback) mode. Circuit operation is thus controlled on a per-frame basis.

When control data is transferred from the signal processor 2 to the micro control unit 1, the digital signal processing circuit 21 of the signal processor 2 stores the operating information as the frame-unit control data to the control register 22. More specifically, the micro control unit 1 starts the reproduction operation, and sends a transmit command through the serial interface 13 to obtain the broadcasting format information and audio sampling frequency information from the signal processor 2.

When the signal processor 2 receives this transfer command, the serial interface circuit 25 reads the control data stored to the control register 22 and serially transfers the information to the micro control unit 1 via the I2C bus 3 using the same I2C protocol. Using the control data received from the serial interface 13, the micro control unit 1 transfers the appropriate display data, for example, to the display apparatus.

The transfer of subcode data and other additional data between the micro control unit 1 and signal processor 2 is described next. The transfer of additional data is accomplished using the dedicated bus 4 while controlling the signal input/output timing using the plural input/output terminals of the micro control unit 1. The additional data more specifically refers to the time code known as the subcode information, the track number, index signals, and similar information.

During recording the micro control unit 1 sets the additional data based on the data input from the input device 11, and transfers this additional data to the signal processor 2 via the dedicated bus 4. Note that the dedicated bus 4 carries the read signal, write signal, eight address signals, eight data signals, and a strobe signal.

The additional data transferred over the dedicated bus 4 is input to the dedicated bus interface circuit 26 of the signal processor 2 and stored to the additional data memory 24. This additional data is read from the additional data memory 24 as needed by the digital signal processing circuit 21 and recorded with the audio and video data to the magnetic tape recording medium.

During the reproduction operation the digital signal processing circuit 21 of the signal processor 2 stores the reproduced additional data to the additional data memory 24. The micro control unit 1 sends a transfer command to obtain the additional data from the signal processor 2 as needed. This transfer command is more specifically a read signal and the address signal of the required additional data. When the signal processor 2 receives the transfer command the additional data stored in the additional data memory 24 is read out by the dedicated bus interface circuit 26 and output to the micro control unit 1. The output timing is synchronized to the strobe signal output from the micro control unit 1. The micro control unit 1 then interprets the additional data to, for example, convert the additional data to a linear counter value that is then sent to a display device, or to implement an image search function using the index signal.

In FIG. 9, a second example of conventional digital recording and reproducing apparatuses is shown. This digital recording and reproducing apparatus RRC2 includes a tape drive 202 for driving the recording tape TA, a micro control unit 306 for generating the control signal output to the tape drive mechanism 202, a drum 203 whereby the head is rotated to scan the tape TA and output the reproduction signal, and a reproduction amplifier 208 for amplifying the reproduction signal. Also shown are a tracking error detector 304, a video signal processor 309, and a track ID detection circuit 315. Note that the video signal processor 309 converts the amplified reproduction signal to a video signal Si, and outputs the video signal Si.

During reproduction the micro control unit 306 performs a control calculation based on the detected tracking error to generate the control signal that is then supplied to the drive circuit 211 of the tape drive mechanism 202. The drive circuit 211 supplies a drive current according to this control signal to the capstan motor 213, thereby making it possible to adjust the tape speed. This also enables the rotary head to accurately track the reproduction track.

The structure of the tracking error detector 304 is described next. The tracking error detector 304 comprises an analog-digital (A/D) converter 314, a digital error detection circuit 340, and a digital-analog (D/A) converter 344. The digital error detection circuit 340 generally comprises a bandpass filter for extracting the signal of frequency f1, a bandpass filter for extracting the signal of frequency f2, AM wave detection circuits, and a difference circuit 243, as well known to the personnel skilled in the art.

Note using a digital design for this difference circuit achieves significantly a higher degree of circuit integration, circuit reliability, and bandpass filter performance (Q value) than does an analog circuit design. Using a digital error detection circuit 340, however, requires the use an A/D converter 314. Conventional control micro control units also normally have an A/D converter built in. As a result, a D/A converter is needed for interfacing with the micro control unit. Note that this type of tracking error detection circuit is normally comprised in an IC chip discrete from the other circuits.

In FIG. 10, a third example of conventional digital recording and reproducing apparatus according to a third example of the prior art is shown in FIG. 10. This digital recording and reproducing apparatus RRC3 includes the magnetic tape TA, a signal processing circuit 400, a micro control unit 401, and a capstan motor 402 for producing a reference frame signal Sf.

The signal processing circuit 400 has a demodulating circuit 403, an inner error correction decoding circuit 404, an ATF error detection circuit 405, a track number detection circuit 406, a memory controller 407, a memory unit 408 with capacity sufficient to store at least m×2 frames of reproduction data, an outer error correction decoding circuit 409, and a high performance decoding circuit 410 for outputting the reference frame signal Sf to the timing controller 412 of the micro control unit 401.

The micro control unit 401 comprises a capstan motor controller 411, and a timing controller 412. The timing controller 412 detects the phase error between the frame phase of the reproduction signal and the reference frame signal Sf based on the reference frame signal Sf and the reproduction track to control the capstan motor controller 411.

When tape reproduction begins the reproduction data reproduced from the magnetic tape TA is input to the demodulating circuit 403 and ATF error detection circuit 405. The demodulating circuit 403 demodulates the reproduction data and outputs to the inner error correction decoding circuit 404 and track number detection circuit 406. The ATF error detection circuit 405 detects the synchronization error in the reproduction data, and sends an error signal to the capstan motor controller 411.

Based on this error signal, the capstan motor controller 411 synchronizes tape travel by track unit. After track synchronization is accomplished, the timing controller 412 detects the phase difference between the frame phase of the reproduction signal and the reference frame signal Sf based on the track number output from the track number detection circuit 406 and the reference frame signal Sf output from the decoding circuit 410. If a phase difference is detected, the capstan motor controller 411 is notified of the phase difference, thus enabling the capstan motor controller 411 to increase or decrease the speed of the magnetic tape TA to achieve a zero phase difference. The capstan motor controller 411 then re-references the error signal to re-synchronize the track and confirm whether the phase difference is zero.

Simultaneously to this operation of the capstan motor controller 411, the inner error correction decoding circuit 404 applies error correction decoding to the demodulated reproduction data and outputs to the memory controller 407. The memory controller 407 stores the reproduction data to the memory unit 408. The outer error correction decoding circuit 409 then applies track unit correction decoding to the reproduction data stored to the memory unit 408 based on the reference frame signal Sf output from the decoding circuit 410. The decoding circuit 410 then selects in track units m frames of the reproduction data stored in the memory unit 408 for which the outer error correction decoding has been completed, outputs the data from the memory unit 408, applies high efficiency decoding, and outputs the decoded signal.

SUMMARY OF THE INVENTION

The object of the present invention is therefore to provide an imaging device which solves these problems.

The present invention has been developed with a view to substantially solving the above described disadvantages and has for its essential object to provide an improved eternal expansion bus interface circuit.

In order to achieve the aforementioned objective, an external expansion bus interface circuit for connecting a peripheral to a micro control unit to exchange digital information under an external expansion memory mode of said micro control unit comprises memory means for storing a data; and address decoding means for receiving said data, an address strobe, and a write strobe from said micro control unit to produce an enable signal for enabling said memory means to store said data at address designated said data.

BRIEF DESCRIPTION OF THE DRAWINGS

The present invention will become more fully understood from the detailed description given below and the accompanying diagrams wherein.

DESCRIPTION OF PREFERRED EMBODIMENTS

Figure 1:
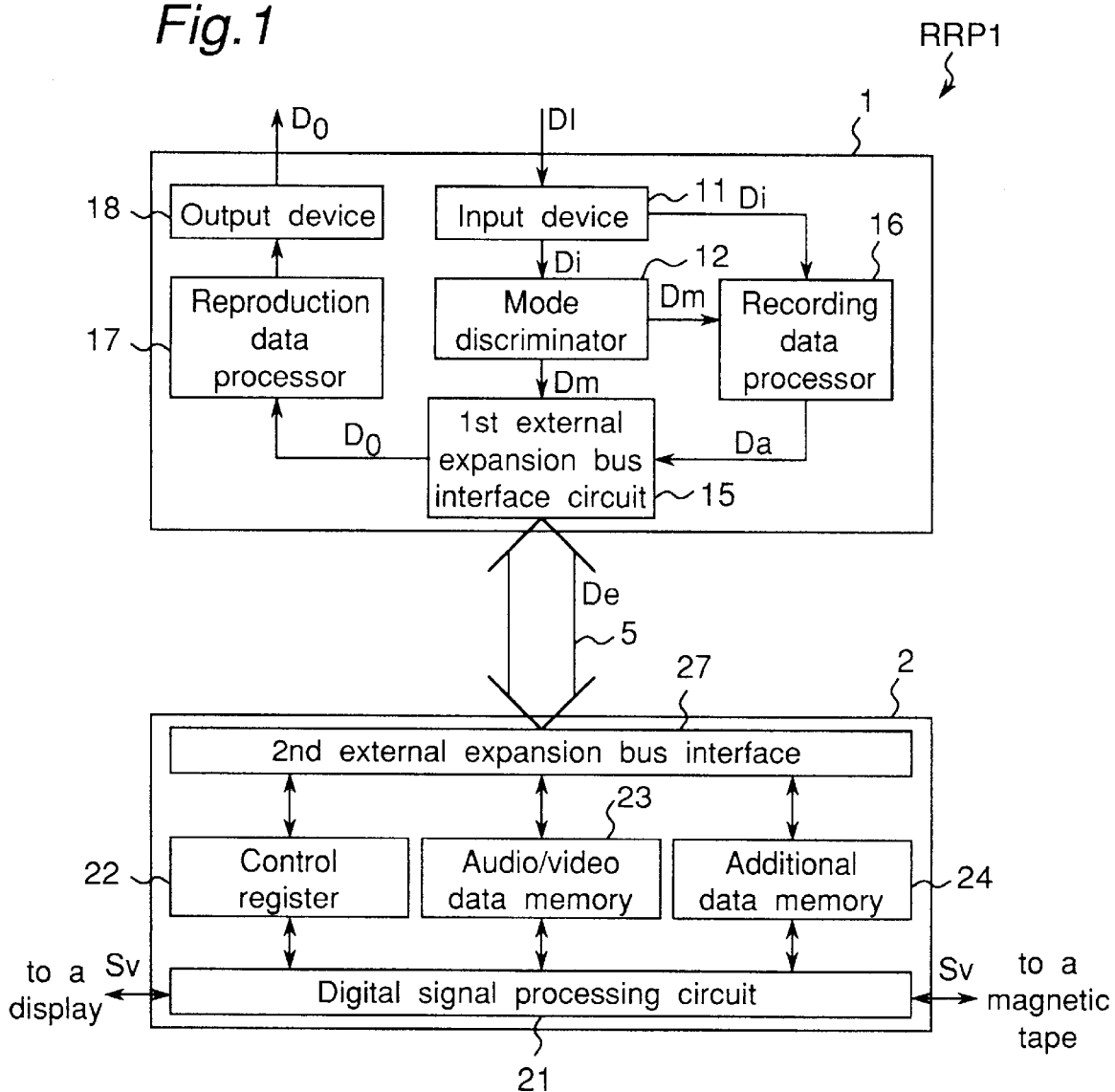
FIG. 1 is a block diagram showing a digital recording and reproducing apparatus according to a first embodiment of the present invention.

The preferred embodiments of the present invention are described below with reference to the accompanying figures. First of all, the principle of digital recording and reproducing apparatus RRP (not shown) according to the present invention and a micro control unit (MCU) is described, prior to the detailed explanation of various specific constructions thereof.

A micro control unit (MCU) is usually constructed in a LSI chip basically comprising a micro processing unit (MPU), some peripherals such as a timer, a serial interface, and an I/O, and other devices such as RAMs and ROMs. Furthermore, a micro processing unit (MPU) can be constructed by a central processing unit (CPU) and some managing devices such as an interrupt controller and a bus manager.

A digital recording and reproducing apparatus RRP (not shown) connects an external expansion bus from a micro control unit to a signal processing device comprising a digital signal processing circuit for recording and reproduction processing digital data, a control register for storing the control data controlling the operation of the digital signal processing circuit, and an external expansion bus interface circuit enabling a connection to the external expansion bus of a micro control unit having an external expansion memory mode. Thus comprised, the micro control unit handles the control data transfer process to the control register in an external expansion memory mode via the external expansion bus interface circuit of the signal processing unit.

The digital recording and reproducing apparatus RRP connects an external expansion bus from the micro control unit to a signal processing device comprising a digital signal processing circuit for recording and reproduction processing digital data and additional data, an additional data memory unit for storing additional data during the signal processing operation of the digital signal processing circuit, and an external expansion bus interface circuit enabling a connection to the external expansion bus of a micro control unit having an external expansion memory mode. Thus comprised, the micro control unit handles the additional data transfer process to the additional data memory unit in an external expansion memory mode via the external expansion bus interface circuit of the signal processing unit.

The digital recording and reproducing apparatus RRP connects an external expansion bus from the micro control unit to a signal processing device comprising a digital signal processing circuit for recording and reproduction processing audio and video data, an audio and video data memory unit for storing the audio and video data during the signal processing operation of the digital signal processing circuit, and an external expansion bus interface circuit enabling a connection to the external expansion bus of a micro control unit having an external expansion memory mode. Thus comprised, the micro control unit handles the audio and video data transfer process to the audio and video data memory unit in an external expansion memory mode via the external expansion bus interface circuit of the signal processing unit.

The preferred embodiments of the present invention are described below with reference to the accompanying figures.

(First embodiment)

Referring to FIG. 1, a digital recording and reproducing apparatus RRP1 according to a first embodiment of the present invention is shown. The digital recording and reproducing apparatus RRP1 mainly comprises a micro control unit (MPU) 1, a signal processor 2, and an external expansion bus 5 connecting thereof for exchanging various digital data De.

Figure 7:
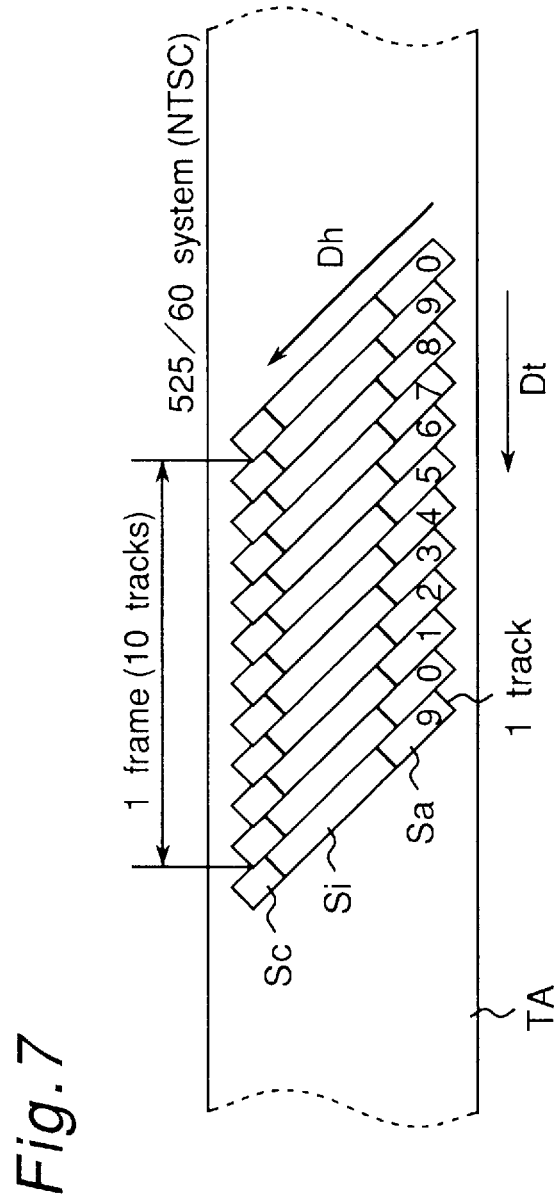
FIG. 7 is a graph showing a tape recording format in a DV-type digital VCR.

The signal processor 2 receives the source data from external data source such as a digital video recorder and a broadcasting system. The signal processor 2 applies various processes to the source data, and produces a data in the form suitable for the system and peripherals such as a display and a digital video tape TA (FIG. 7), and so on. The function of the signal processor 2 is to handle recording and reproduction processing of the audio and video data and additional data as digital data.

The signal processor 2 performs the digital signal processing needed to record and reproduce digital audio, video, and additional data. For this purpose, the signal processor 2 includes a digital signal processing circuit 21, a control register 22, an audio/video data memory 23, an additional data memory 24, and a second external expansion bus interface circuit 27. The digital signal processing circuit 21 does the actual digital recording and reproducing processing for the audio, video, and additional data, and is connected to external data sources for exchanging those data therewith.

The control register 22 is connected to the digital signal processing circuit 21 to exchange various control data therebetween to control the operation of the digital signal processing circuit 21. The audio/video data memory 23 is connected to the digital signal processing circuit 21 for exchanging the audio and video data therebetween during the signal processing operation of the digital signal processing circuit 21, and further stores those source data therein. The additional data memory 24 is connected to the digital signal processing circuit 21 for exchanging an additional data such as subcode data Sc and other additional data during the signal processing operation of the digital signal processing circuit 21.

The second external expansion bus interface circuit 27 is connected to the control register 22 for exchanging the control data therebetween; to the audio/video data memory 23 for exchanging the control data, audio and video data therebetween; and to the additional data memory 24 for exchanging the additional data therebetween. The second external expansion bus interface circuit 27 is further connected to a first external expansion bus interface circuit 15 of the micro control unit 1 for exchanging the digital data De including transferring the control data, audio and video data, and subcode and other additional data therebetween under an external expansion bus mode of the micro control unit 1.

Specifically, the first external expansion bus interface circuit 15 is generally provided in a common micro control unit (MCU) 1 for enabling the peripherals to exchange data with the micro control unit at very high speed utilizing an external expansion bus mode of the MCU. For this purpose, the first external expansion bus interface circuit (15) incorporated in the MCU generates various control signals which will be described later with reference to Fog. 3. The micro control unit 1 determines the operation of overall system based on the control information supplied by an external information source such as a user, and exchange the data with the signal processor 2 through the external expansion bus 5. The micro control unit 1 includes an input device 11, a mode discriminator 12, a first external expansion bus interface circuit 15, a recording data processor 16, a reproduction data processing means 17, and an output device 18. The input device 11 is connected to an external information source (not shown) for receiving an information DI enabling the status of the overall system to be determined, and encode the information DI to produce an encoded information Di in a form convenient for the system. The mode discriminator 12 is connected to the input device 11 for receiving the encoded information Di therefrom to determine the operating mode of the overall system based on the information Di, and produce an command signal Dm to the system.

The recording data processor 16 is connected to the input device 11 and the mode discriminator 12 for receiving the encoded information signal Di and command signal Dm therefrom, respectively. The recording data processor 16 sets an additional data Da recorded to the magnetic tape during recording.

The first external expansion bus interface circuit 15 is connected to the mode discriminator 12 and the recording data processor 16 for receiving the command signal Dm and the additional data Da therefrom, respectively. The first external expansion bus interface circuit 15 is, as described in the above, further connected to the second external expansion bus interface circuit 27, and controls the transfer of the digital data De including the source data Sv such as audio and video data, control data, and additional data with the signal processor 2.

The reproduction data processor 17 is connected to the first external expansion bus interface circuit 15 for receiving the data Do reproduced during reproduction from the magnetic tape and input from the signal processor 2 by the transfer unit 15 through the external expansion bus 5. The reproduction data processor 17 processes that reproduced data Do to convert in a form suitable for the external peripheral devices.

The output device 18 is connected to the reproduction data processor 17 for receiving thus converted reproduced data Do including audio and video data, control data, and additional data transferred to output as an reproduction data to the external devices such as a display device or personal computer through an external interface (not shown).

Herebelow, an operation of the digital recording and reproducing apparatus RRP1 is described.

The micro control unit 1 that is set to the external expansion memory mode receives input DI from the external source through the input device 11. This input DI may include, for example, signals from keys or buttons operated by the user or other information enabling the micro control unit 1 to determine the status of the VCR. This information DI (Di) is transferred by the input device 11 to the mode discriminator 12 and recording data processor 16. The mode discriminator 12 uses this information Di to control the mechanical and other operating blocks of the system, and thereby effects operating mode changes, during which mode information Dm and other control data (Da) is sent to the signal processor 2.

The first external expansion bus interface circuit 15 comprises the hardware for controlling the data transfer timing and the software for setting the address data and recording data. The first external expansion bus interface circuit 15 thus executes the data transfer command of the micro control unit 1 to transfer the address data and other data through the external expansion bus 5 to the signal processor 2.

The data De transferred via the external expansion bus 5 is input to the second external expansion bus interface circuit 27 of the signal processor 2. If the input address data is control data, the data is stored to the control register 22. The control data is read out by the digital signal processing circuit 21 at the beginning of each track to control circuit operation on a track unit basis.

This operation enables the micro control unit 1 to execute detailed control of the signal processor 2 track by track. Because the micro control unit 1 can thus control the evaluation process of the signal processing operation programmatically, the circuit area of the signal processor 2 is less than that of conventional designs. In addition, by programming the evaluation component of signal processor 2 operation, the occurrence of bugs can be reduced and a more flexible design can be achieved.

The method of transferring control data De from the signal processor 2 to the micro control unit 1 is stored to the control register 22 of the signal processor 2. More specifically, the operating information of the digital signal processing circuit 21 is stored as track-unit control data to the control register 22 of the signal processor 2. The micro control unit 1 sets an address in the control register 22 as the address of the external expansion memory, and can thus execute a data transfer command to read the target data. More specifically, the first external expansion bus interface circuit 15 sends the read transfer command address to the signal processor 2. Thus, if the address of the transfer command received by the signal processor 2 is a control data address, the second external expansion bus interface circuit 27 reads the control data stored to the control register 22 and outputs to the micro control unit 1 synchronized to the strobe output by the micro control unit 1. The micro control unit 1 stores the received data to an internal memory or register and uses it as needed.

The micro control unit 1 can thus freely read control data from the signal processor 2 as needed. The read time is 444 nsec or less assuming an operating clock of 13.5 MHz with a 74 nsec cycle time because 3 to 4 cycles are required to execute the data transfer command and there is a 1 to 2 cycle delay for accessing the external memory. The transfer rate is therefore faster than the transfer rate of conventional serial data transfer operations, and even higher speed processing can be achieved because a program controlling transfers is not needed.

When the micro control unit 1 next transfers audio and video data to the signal processor 2, the digital audio and video data DI input from an external source is input to the input device 11 of the micro control unit 1, the recording data processor 16 processes this input data as recording data, and the first external expansion bus interface circuit 15 then transfers the processed data Da to the signal processor 2.

The data De transferred over the external expansion bus 5 to the second external expansion bus interface circuit 27 of the signal processor 2 is then stored to the audio/video data memory 23 if the supplied address is that of audio and video data. The digital signal processing circuit 21 then reads the audio and video data from the audio/video data memory 23.

When audio and video data (De) is transferred from the signal processor 2 to the micro control unit 1, the reproduced audio and video data is stored by the digital signal processing circuit 21 to the audio/video data memory 23. As when reading the control data, the micro control unit 1 can read the audio and video data by specifying the memory address at which the audio and video data is stored.

More specifically, the micro control unit 1 uses a transfer command to transfer the memory address data at which the audio and video data is stored. If the address of the received transfer command is the address of audio and video data, the second external expansion bus interface circuit 27 of the signal processor 2 reads the audio and video data stored to the audio/video data memory 23, and outputs to the micro control unit 1 at the strobe supplied by the micro control unit 1. The reproduction data processor 17 of the micro control unit 1 then interprets the read audio and video data, and transfers the data through the output device 18 when the data is to be transferred to an external device.

By means of this operation image data recorded to a magnetic tape can be transferred to, for example, a personal computer. Image data created or edited on a personal computer can also be recorded to magnetic tape.

Figure 8:
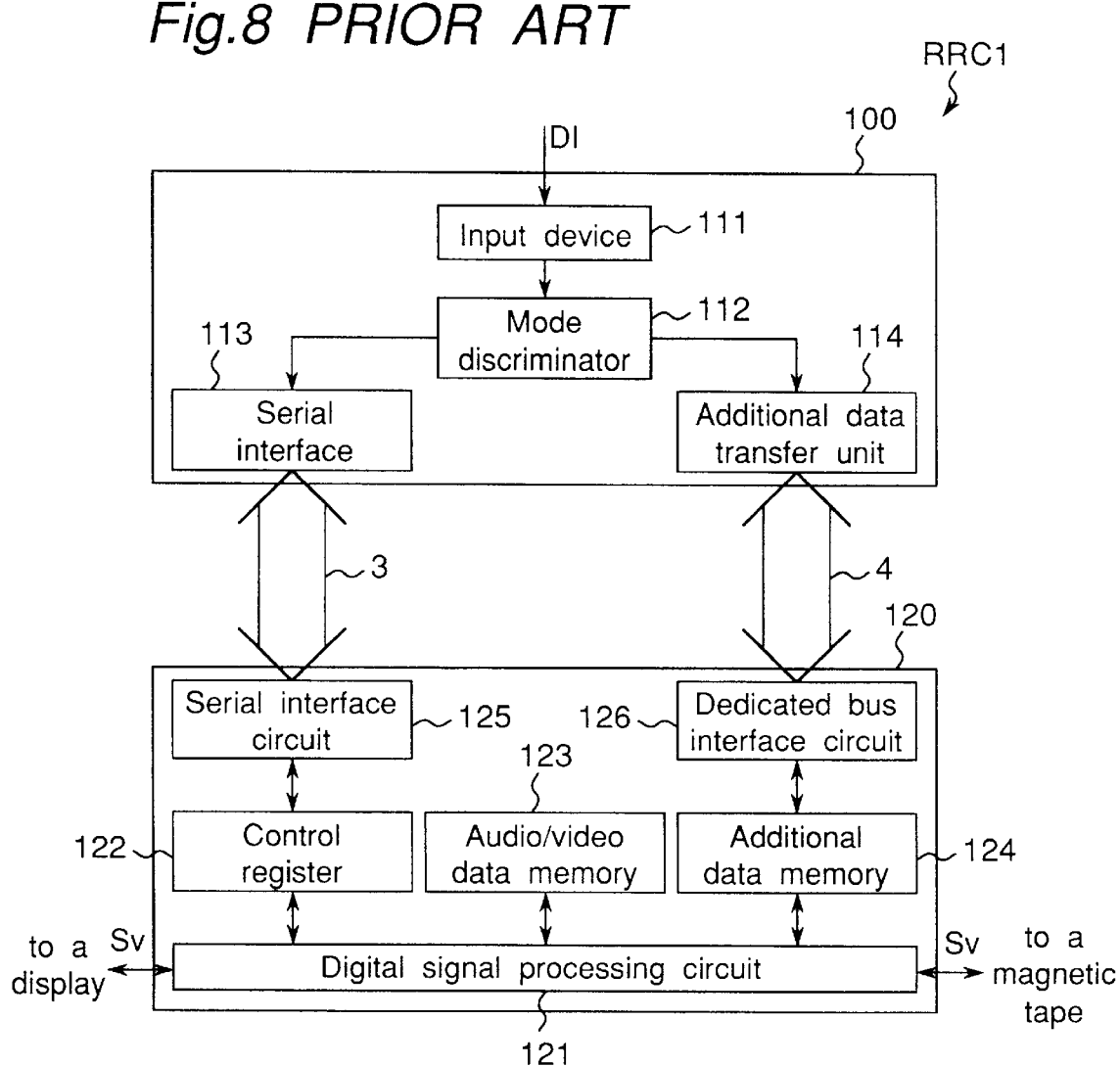
FIG. 8 is a block diagram showing an example of conventional digital recording and reproducing apparatus.
Figure 9:
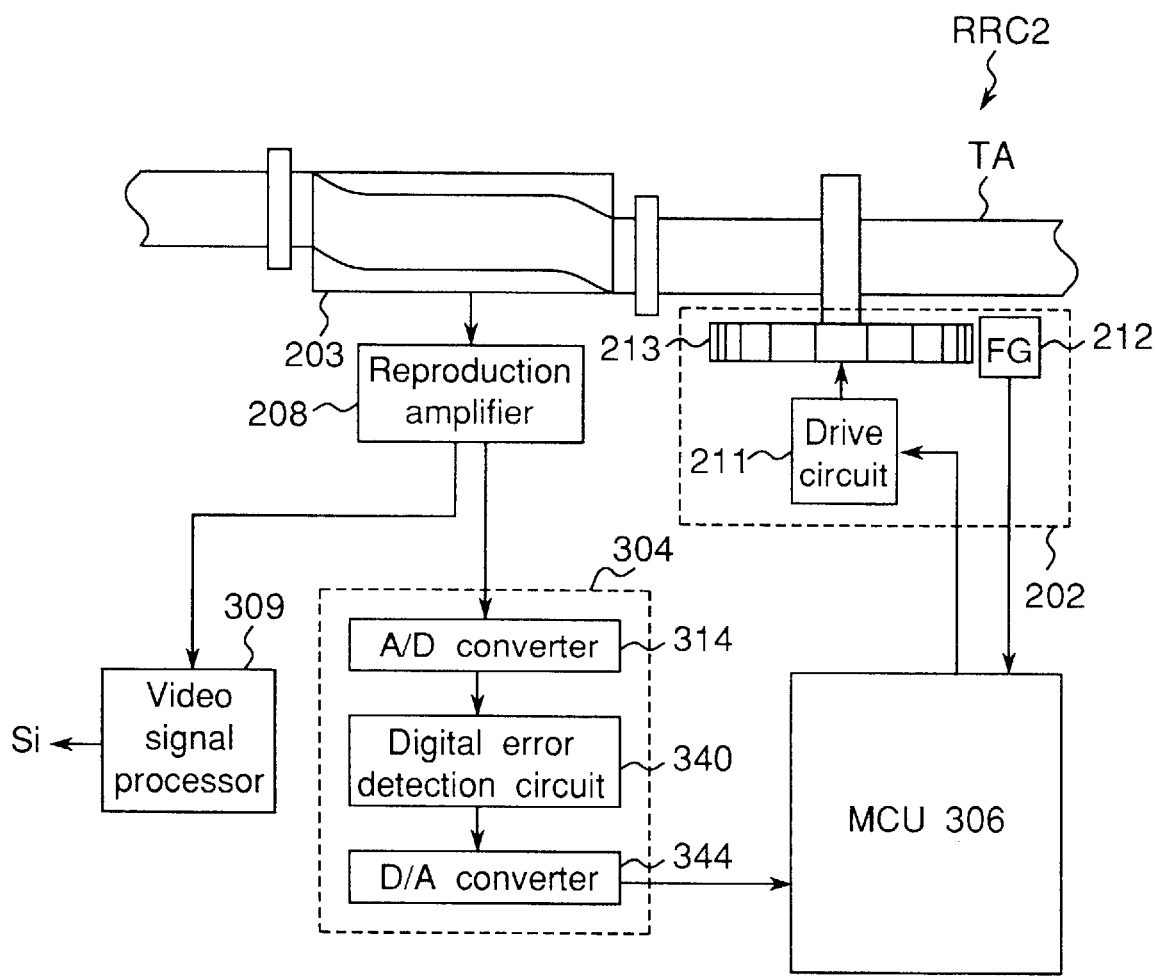
FIG. 9 is a block diagram showing other example of the conventional digital recording and reproducing apparatus.
Figure 10:
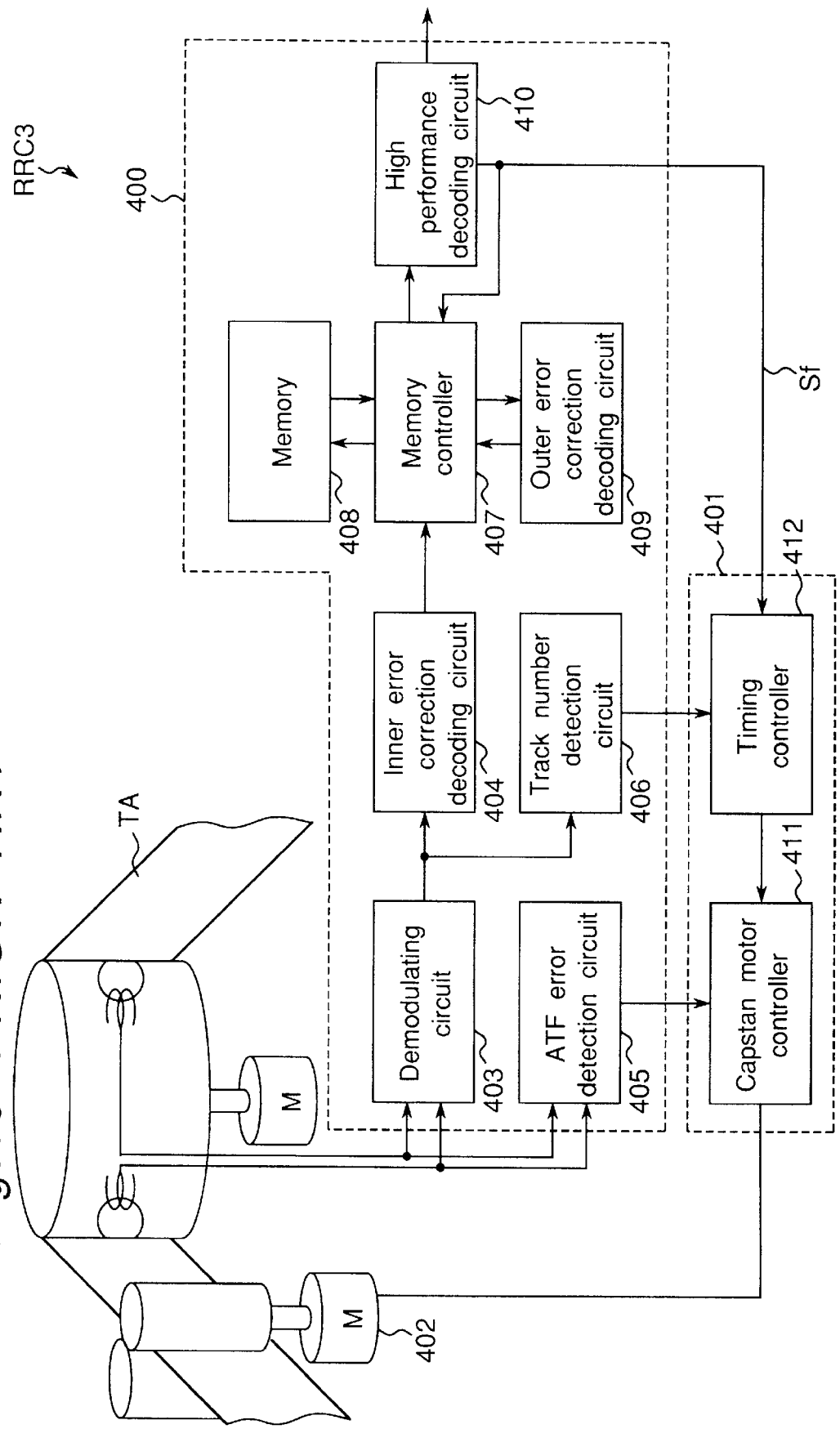
FIG. 10 is a block diagram showing further other example of conventional digital recording and reproducing apparatus.

The procedure for transferring subcode and other additional data shown in FIG. 8 between the micro control unit 1 and signal processor 2 is accomplished in the same way as transferring control data and audio and video data. More specifically, by setting the data addresses on both the micro control unit 1 and signal processor 2, all data can be read and written using transfer commands from the micro control unit 1.

For example, when additional data is transferred from the signal processor 2 to the micro control unit 1 and the micro control unit 1 specifies by means of a transfer command the address of the additional data, the second external expansion bus interface circuit 27 of the signal processor 2 reads the additional data stored to the additional data memory 24 if the received transfer command address is that of additional data. And then, the second external expansion bus interface circuit 27 outputs to the micro control unit 1 synchronized to the strobe supplied by the micro control unit 1.

The additional data transferred to the micro control unit 1 is passed by the first external expansion bus interface circuit 15 to the reproduction data processor 17, which then interprets the data. The data is then output from the output device 18 as required. By means of this procedure the time data recorded to the magnetic tape, for example, is processed as described above and output to the display device.

Because an external expansion bus is used in place of a dedicated bus for additional data transfers in this operation, the micro control unit 1 does not require separate input/output terminals, a program for controlling transfers is not required, and high speed processing is therefore possible. Furthermore, because the micro control unit 1 can freely read and write data from the signal processor 2 as required, real-time processing of the additional data by the micro control unit 1 is possible, and the circuit area of the signal processor 2 is less than that of conventional digital recording and reproducing apparatuses.

It should be noted that while the control data register, audio and video data memory, and additional data memory are discretely provided in the present embodiment, this configuration is not related to the fundamental configuration and operation of the present invention, and the audio and video data, control data, and additional data can be stored using various combinations of memory units.

The present embodiment has also been described with reference to a digital recording and reproducing apparatus using a magnetic tape medium, but it will be obvious that the invention shall not be limited to the media type and disk media can also be used for data storage.

Furthermore, the digital recording and reproducing apparatus RRP1 can comprise a tape drive device for transporting in the lengthwise direction a tape medium to which data and a tracking pilot signal are recorded in diagonal tracks, a drum for rotationally driving a recording/reproducing head to scan the tape medium and output a reproduction signal, a tracking error signal detector for digitally detecting a tracking error signal from the pilot signal contained in the reproduction signal, a memory unit for storing the digital tracking error signal output from the tracking error signal detector, a micro control unit for executing a digital control operation and generating a control signal for operating the tape drive device, and a digital bus for accessing the memory from the micro control unit.

This micro control unit generates said control signal based on the digital tracking error signal obtained by accessing the memory unit via the digital bus, and the tape drive device then transports the tape medium according to this control signal. When the micro control unit generating the control signal obtains a tracking error signal, the reproduction apparatus of this embodiment can access at high speed in the same manner as random access memory (RAM).

Still further, the digital recording and reproducing apparatus RRP1 can comprise a tape drive device for transporting in the lengthwise direction a tape medium to which data is recorded by dividing the data into frames containing a predetermined length of data, recording one frame of data to plural diagonal tracks, and recording to each track a tracking pilot signal and a frame phase data signal identifying the position of each track within at least one data frame; a drum for rotationally driving a recording/reproducing head to scan the tape medium and output a reproduction signal; a tracking error signal detector for digitally detecting a tracking error signal from the pilot signal contained in the reproduction signal; a reference generator for generating the frame reference signal of the reproduction signal; a frame phase detection means for detecting the frame phase detection data signal contained in the reproduction signal; a memory unit for storing the digital tracking error signal output from the tracking error signal detector and the frame phase detection data signal from the frame phase detection means; a micro control unit for executing a digital control operation and generating a control signal for operating the tape drive device; and a digital bus for accessing the memory from the micro control unit contained in the tape drive device.

This micro control unit generates said control signal based on the digital tracking error signal stored in memory, the frame phase data signal, and the frame reference signal of the reference generator, and the tape drive device then transports the tape medium according to this control signal. In the reproduction apparatus of this embodiment high speed access from the micro control unit is possible according to the tracking error signal, and frame phase data can be transferred to the micro control unit using the digital bus.

Figure 2:
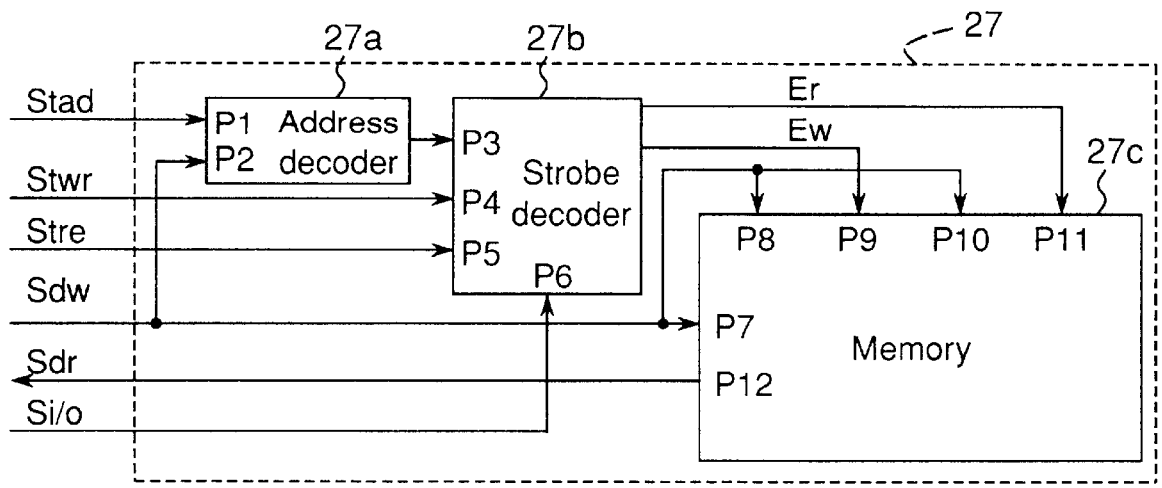
FIG. 2 is a block diagram showing an external expansion bus interface circuit incorporated in the digital recording and reproducing apparatus of FIG. 1.

Referring to FIG. 2, the second external expansion bus interface circuit 27 incorporated in the digital recording and reproducing apparatus RRP1 is shown. The second external expansion bus interface circuit 27 includes an address decoder 27a, a strobe decoder 27b, and a memory 27c.

The address decoder 27a has two input ports P1 and P2 connected to first external expansion bus interface circuit 15 for receiving an address strobe Stad and a write data Sdw therefrom, respectively. Based on these data Stad and Sdw, the address decoder 27a converts a numeric address to the memory 27c.

The strobe decoder 27b has four input ports P3, P4, P5, and P6. The input port P3 is connected to the address decoder 27a for receiving the converted address. The ports P4 and P5 are connected to first external expansion bus interface circuit 15 for receiving a write strobe Stwr, a read strobe, and a data I/O control Si/o, respectively, therefrom. Based on these data, the strobe decoder 27b produces a write enable signal Er and a read enable signal Ew. The read enable signal Er is a timing signals which enables the memory 27c to read the data therefrom. The read enable signal E is a timing signal which enables the memory 27c to write the data therein.

The memory 27c has five input ports P7, P8, P9, P10, and P11, and one output port P12. The input ports P7, P9, and P10 are connected to the first external expansion bus interface circuit 15 for receiving the write data Sdw therefrom. From the input port P7, or write data port, the body of write data Sdw is fed into the memory 27c. From the input port P8, or write address port, the write address of the write data Sdw is fed into the memory 27c. From the input port P10, or read address port, the read address of write data Sdw is fed into the memory 27c.

The input ports P9 and P11 are connected to the strobe decoder 27b for receiving the write enable signal Ew and the read enable signal Er, respectively. In this sense, the input ports P9 and P11 may be referred to as a write enable port and a read enable port, respectively.

From the output port P12, the read data Sdr read out from the memory 27 based on the read address and read enable signal Er fed therein.

Figure 3:
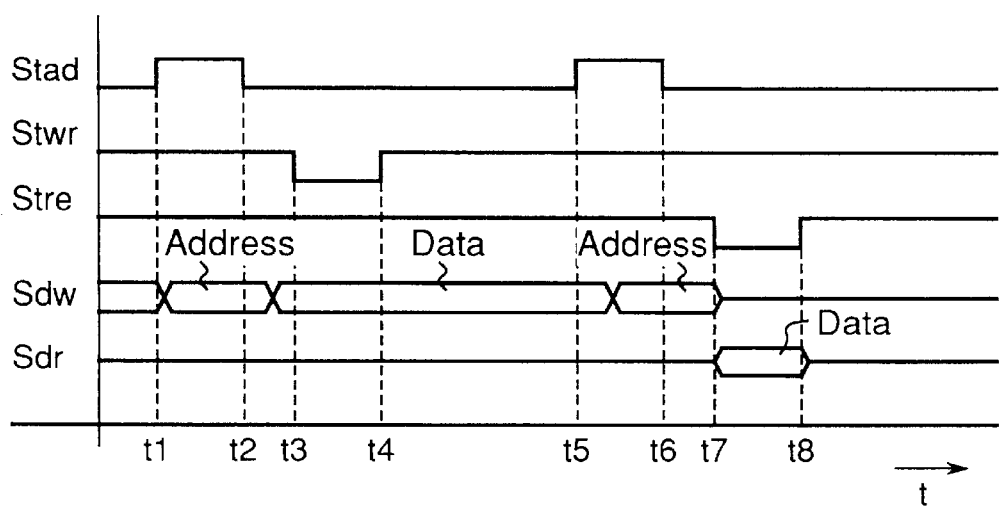
FIG. 3 is a graph showing various signals observed in the external expansion bus interface circuit of FIG. 2.

Referring to FIG. 3, is a graph showing various signals observed in the second external expansion bus interface circuit 27, and also exchanged with the micro control unit 1 through the first external expansion bus interface circuit 15. In this example, the address strobe Stad having two levels, high and low, shows a high level during a first period from time t1 to t2 and a third period from time t5 to t6. The write strobe stwr having two levels, high and low, shows the low level only during a second period from time t3 to t4. The read strobe Stre having tow levels, high and low, shows the low level only during a fourth period from time t7 to t8. The writing data Sdw changes its contents between address and the data boy at a changing pattern typically shown in FIG. 3. The reading data Sdr having the data body is output at the period from tim t7 to t8.

Specifically, according to the behaviors of address strobes Stad and the write strobe Stwr, the address and data of the writing data Swr are effective during the first and second periods, respectively. Then, the data corresponding to the second period is written to the memory 27 at the address corresponding to the first period. Thereafter, the read strobe Stre becomes effective at the fourth period, and the data Str is read out from the memory.

(Second embodiment)

Figure 4:
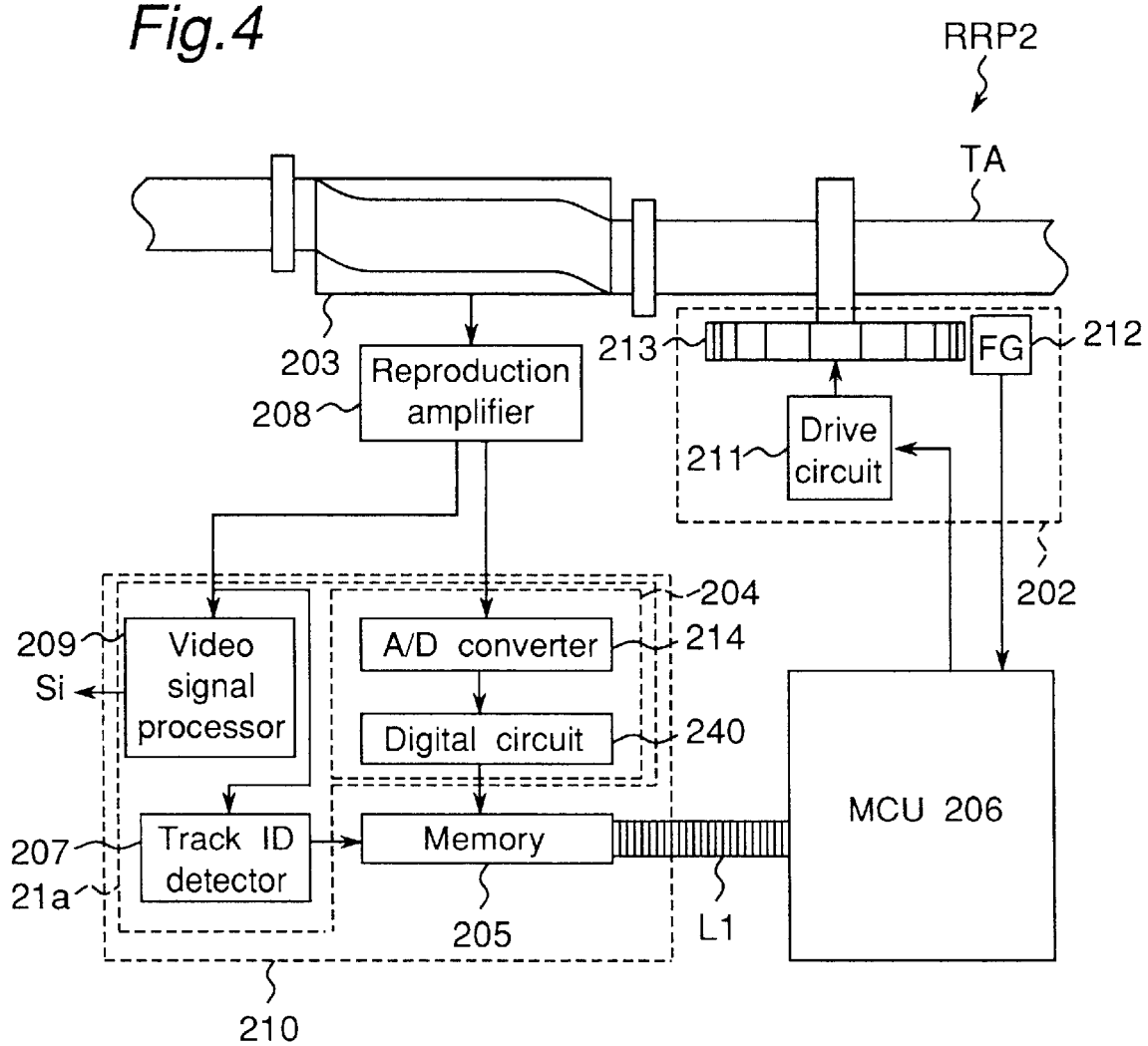
FIG. 4 is a block diagram showing a digital recording and reproducing apparatus according to a second embodiment of the present invention.

Referring to FIG. 4, a digital recording and reproducing apparatus RRP2 according to a second embodiment of the present invention is shown. This digital recording and reproducing apparatus RRP2 includes a tape drive 202 for driving the recording tape TA, a micro control unit (MCU) 206 for generating the control signal output to the tape drive mechanism 202, a drum 203 whereby the head is rotated to scan the tape TA and output the reproduction signal, and a reproduction amplifier 208 for amplifying the reproduction signal.

The micro control unit 206 is similarly constructed to the micro control unit 1 shown in FIG. 1. Also shown are a tracking error detector 204, a video signal processor 209, and a track ID detection circuit 207. Note that the video signal processor 209 converts the amplified reproduction signal to a video signal Si, and outputs the video signal Si.

During reproduction the micro control unit 306 performs a control calculation based on the detected tracking error to generate the control signal that is then supplied to the drive circuit 211 of the tape drive mechanism 202. The drive circuit 211 supplies a drive current according to this control signal to the capstan motor 213, thereby making it possible to adjust the tape speed. This also enables the rotary head to accurately track the reproduction track.

The structure of the tracking error detector 204 is described next. The tracking error detector 204 comprises an analog-digital (A/D) converter 214, and a digital error detection circuit 240 (simply referred to as digital circuit). The digital error detection circuit 240 generally comprises a bandpass filter for extracting the signal of frequency f1, a bandpass filter for extracting the signal of frequency f2, AM wave detection circuits, and a difference circuit 243, as well known to the personnel skilled in the art.

A memory 205 is connected to the digital circuit 240 and the track ID detection circuit 207 for receiving the tracking error data and track ID data, respectively, therefrom. The memory 205 is connected by the external expansion bus L1, substantially the same as the external expansion bus 5 of FIG. 1, through the external expansion bus interface circuit (not shown) of the present invention incorporated therein to exchange the digital data therebetween, as described in the above with reference to FIG. 1.

Note that the tracking error detector 204, track ID detection circuit 207, and the video signal processor 209 construct a digital signal processing circuit 21a corresponding to the digital signal processing circuit 21 used in the digital recording and reproducing apparatus RRP1 of FIG. 1. The tape drive 202 drives the tape TA. The micro control unit 206 generates the control signal output to the tape drive mechanism 202. The drum 203 whereby the head is rotated to scan the tape TA and output the reproduction signal. The reproduction amplifier 208 for amplifying the reproduction signal.

The tracking error detector 204, video signal processor 209, and track ID detection circuit 215. Note that the video signal processor 209 converts the amplified reproduction signal to a video signal, and outputs the video signal. The track ID detection circuit 215 detects the track number, pilot frame signal, and other data. The track number and pilot signal are signals identifying the track position information when one frame of the video signal is divided and recorded to plural tracks using a multiple segment recording method.

In the NTSC format one frame is divided into ten segments recorded to ten tracks. Tracks a–j constitute one frame, and tracks k–t constitute the next track, wherein a, j, k, and t are integers (a<j<k<t). The pilot signal is recorded on a four track cycle. The method of recording the pilot signal is as previously described in the prior art. Because the smallest common multiple of the track number recording frequency (10) and the pilot signal recording frequency (4) is 20, the recording cycles of the track numbers and pilot signals match every two frames (20 tracks). While there are thus two frames in which the pilot signal recording pattern differs, these two frames can be distinguished by means of the pilot signal.

During reproduction the micro control unit performs a control operation based on the calculated tracking error, and generates the control signal input to the drive circuit 211 of the tape drive mechanism 202. The drive circuit 211 supplies a current corresponding to this control signal to the capstan motor 213 to adjust the tape speed. This also enables the rotary head to accurately track the reproduction track.

When there is a frame reference requiring synchronization to something other than the frame phase of the reproduction signal, frame synchronization control of the reproduction frame phase and frame reference is accomplished based on the result of the operation executed by the micro control unit based on the track number and pilot frame signal from the track ID detection circuit 207. During reproduction tracking control and frame synchronization control are accomplished as described above.

Figure 5:
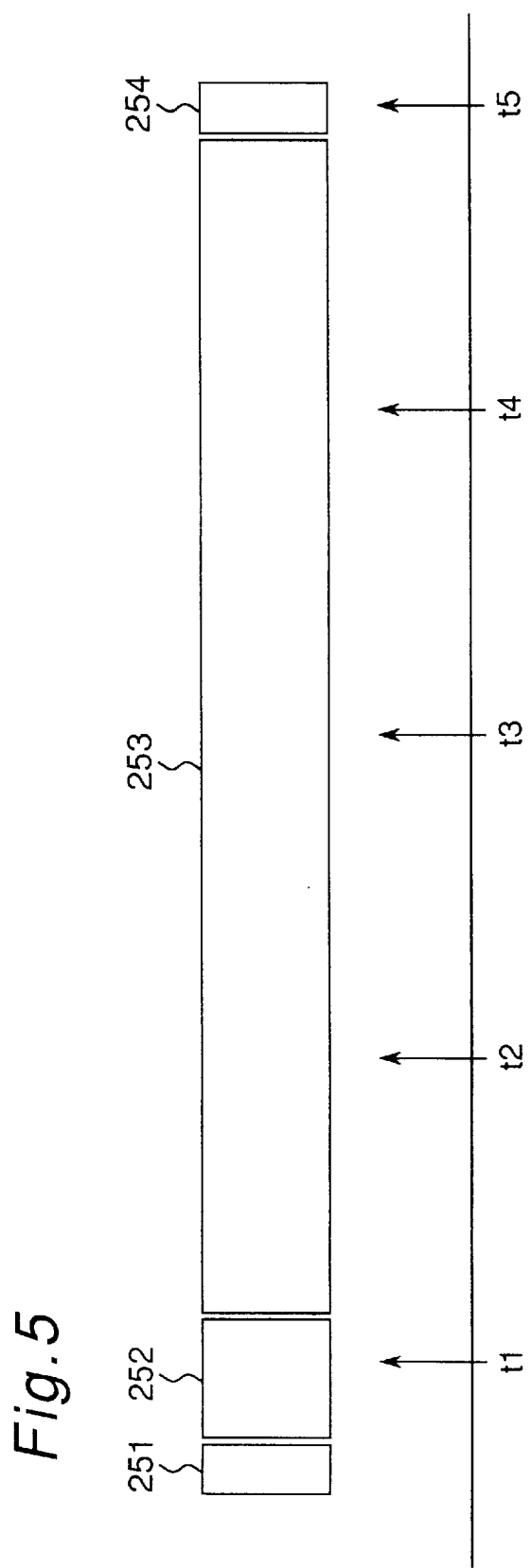
FIG. 5 is a timing chart of the tracking error signal sampling timing.

Referring to FIG. 5, a timing chart of the tracking error signal sampling timing and the detailed structure of each track is shown. As shown in FIG. 5, each track comprises an insert and track information (ITI) sector 251, an audio sector 252, a video sector 253, and a subcode sector 254. In the DV format each of these sectors can be discretely overwritten. In addition, t1, t2, t3, t4, and t5 indicate the tracking error signal sampling timing reference to the track position, wherein "t1 to t5" in this example do not identical to those shown in FIG. 3.

Note that to detect the track curvature information and track the head to a mean position relative to the track curvature the tracking error signal is sampled plural times per track (per single scan of the rotary head) and tracking control is applied. If the recorded tape after insertion editing is considered, it is also preferable to detect the tracking error signal in each sector, i.e., the audio sector 252, video sector 253, and subcode sector 254.

In either event, it is necessary to execute the tracking error signal sampling process plural times per track. For example, if the drum rotates at 9000 rpm and the two heads are provided on the circumferential surface of the cylinder to oppose to each other, as generally adopted in the art, the time required for the head to scan one track is approximately 3.3 msec. If the tracking error signal is sampled five times during this period as shown in FIG. 5, the corresponding processing frequency is approximately 800 µsec. The error signal sampling rate of this process is greater than the tracking control process sampling rate in other formats.

Regarding tracking error signal sampling, conventionally the signal converted to an analog signal by the D/A converter 344 of the tracking error signal detector 304 is transferred to the micro control unit 306. In the micro control unit the A/D converter is activated at a particular timing, and a digital value is stored to a register in the micro control unit. However if this A/D conversion process and the process storing to the register are included, significant time is required in a general-purpose micro control unit, and the load on the CPU of the micro control unit is great as previously described.

In the present embodiment, therefore, the tracking error signal of the tracking error signal detector 214 is stored to a memory unit 205, and the memory unit 205 and micro control unit 206 are connected by means of a digital bus L1. In general the micro control unit is able to set a mode enabling a connection to external RAM. The memory unit 205 uses the same configuration as that external RAM. In addition, the specifications of the digital bus are dependent upon the specifications of the micro control unit, and are therefore not specifically defined here or limited by the present invention. Because the micro control unit 206 can access the memory unit 205 at high speed similarly to accessing RAM, the micro control unit 206 can obtain the tracking error signal at high speed. As a result, the CPU load of the micro control unit 206 can be greatly reduced.

Furthermore, when one frame is divided into ten segments and recorded to ten tracks as described above and it is necessary to synchronize the frame reference signal with the reproduction frame signal, it is necessary to detect the reproduction track number by means of the track ID detection circuit 215, and detect the phase difference between the reproduced track number and the frame reference signal. The micro control unit 206 must recognize this phase difference, but it is also possible to store the track number detected by the track ID detection circuit 215 to memory unit 205 and transfer the track number to the micro control unit via the digital bus. This case has the advantage of not requiring a dedicated structure for transferring the reproduced track number.

Further benefits of connecting the memory unit 205 to the micro control unit 206 by means of a digital bus L1 are described below. As described above with reference to FIG. 5, a subcode sector is provided at a particular location in the diagonal tracks formed on tape in a DV format digital VCR and video camera. A time code and other information used for high speed searches and editing are recorded to this subcode sector. To control tape travel based on such subcode information, this subcode information must be obtained by the control processor. Because a subcode sector is provided in each track in the DV format, the subcode information is preferably supplied to the micro control unit track by track. To accomplish this a circuit for detecting the subcode information from the reproduction signal is added to the configuration of the present embodiment, thereby enabling the detected subcode information to be stored to the memory unit 205. With this configuration the subcode information can be obtained at high speed from the micro control unit. By applying the reproduction apparatus of the present embodiment to a VCR, a high performance, high functionality VCR can be achieved.

In the configuration of the present invention thus described various data that must be supplied to the micro control unit 206 is stored to the memory unit 205, and the memory unit 205 can be accessed at high speed by the micro control unit using the digital bus L1. The various effects described above can be achieved as a result.

In addition, it is generally preferable for a control micro control unit to have high general utility. The micro control unit functions required in the reproduction apparatus of a tape medium do not vary significantly according to the format, including VHS, 8 mm, and DV. On the other hand, the signal processor circuit necessary depends upon the tape format. The circuitry of an analog VCR and a digital VCR are completely different. Regarding the tracking error detection circuit used with 8 mm tape and DV tape, the frequency and S/N ratio of the recorded pilot signal are completely different, and the required detection precision is completely different. Therefore, different circuit designs are required for the tracking error detection circuit according to the tape format. Therefore, even if high circuit integration is a design goal, it is preferable to integrate the tracking error detection circuit into the signal processor, which is highly dependent upon the format and is frequently achieved by means of a custom IC, rather than in the micro control unit, which is generally designed for high general utility.

In particular, the pilot signal used in the DV format is 465 kHz and 697.5 kHz. To detect this frequency in a digital circuit, the operating frequency of the A/D converter integrated into the micro control unit must be extremely high, e.g., approximately 2.79 MHz. From this perspective, too, the tracking error detection circuit is preferably built in to the signal processor.

It should be noted that while the above embodiment has been described with reference to the DV format, the present invention shall not be so limited. More specifically, the present embodiment can be applied to any apparatus wherein digital circuits are used in the reproduction signal processing circuit, and a pilot signal recorded with the data to each track is detected to control tracking using an automatic track finding (ATF) control technique. The head arrangement on the drum, and the configuration of the digital signal processing circuit shall also not be limited to the embodiments described above. The digital error detection circuit 240 shall also not be limited to the embodiments described above. Other configurations can be used to increase the Q value. In addition, reproduction of audio and video signals was described by way of example only. The signals reproduced shall not be limited, and the present invention can be applied to devices reproducing digital information signals and used as an external storage medium of a computer. The above variations shall all be considered to be contained within the present invention.

The digital recording and reproducing apparatus RRP2 can be constructed in a helical scan type digital magnetic recording and reproducing apparatus whereby digitized audio and video signal data is recorded to recording tracks formed diagonally to the length of a magnetic tape by dividing and recording m frames (where m is an integer greater than or equal to one) of digital data to n tracks (where n is an integer greater than or equal to one), a track number specific to the m frame cycle is assigned to each track, and the signal is recorded and reproduced by means of a rotating head.

This helical scan type digital magnetic recording and reproducing apparatus is constructed by a means for detecting the specific track number from each reproduction track, a means for controlling the lengthwise transportation of the tape, memory capable of storing at least m×2 frames of reproduced digital data, a memory output means for outputting from the memory at a specific reference frame m frames of the digital data stored to the memory, a frame phase difference detection means for detecting the phase difference between the frame phase of the reproduction signal and the phase of the reference frame based on the track number and the reference frame, and an output controller for selecting an m-frame equivalent amount of digital data in track units from the memory according to the phase difference signal from the frame phase difference detection means to control the digital data output by the memory output means. It is therefore possible to achieve high speed frame synchronization by selecting m frames of digital data and controlling the memory output means without changing the tape speed.

Furthermore, the digital recording and reproducing apparatus RRP2 can be constructed in a helical scan type digital magnetic recording and reproducing apparatus whereby audio and video signal data is recorded to recording tracks formed diagonally to the length of a magnetic tape by digitizing and outer and inner coding the data, dividing and recording m frames (where m is an integer greater than or equal to one) of digital data to n tracks (where n is an integer greater than or equal to one), a track number specific to the m frame cycle is assigned to each track, and the digital data and a pilot signal for tracking is recorded and reproduced by means of a rotating head.

This helical scan type digital magnetic recording and reproducing apparatus is constructed by a means for detecting the specific track number from each reproduction track; a means for detecting the tracking pilot signal in the reproduced track; a means for detecting the tracking error signal from the tracking pilot signal; a means for controlling the lengthwise transportation of the tape based on the tracking error signal; a means for inner code correction processing the reproduced digital data; memory capable of storing at least m×2 frames of reproduced digital data; a means for outer code correction processing in at least track units the digital data in memory; a memory output means for outputting from the memory at a specific reference frame m frames of the digital data stored to the memory; a frame phase difference detection means for detecting the phase difference between the frame phase of the reproduction signal and the phase of the reference frame based on the track number and the reference frame; an output controller for selecting an m-frame equivalent amount of digital data in track units from the memory according to the phase difference signal from the frame phase difference detection means to control the digital data output by the memory output means; a control means for controlling the track to which correction processing by the outer code correction processing means is applied to the digital data according to the phase difference signal from the frame phase difference detection means; and an output control means for selecting in track units an m frame-equivalent amount of digital data from memory according to the phase difference signal from the frame phase difference detection means, and controlling the digital data output by the memory output means. It is therefore possible to achieve high speed frame synchronization by controlling the outer code correction processing means and the memory output means without changing the tape speed.

(Third embodiment)

Figure 6:
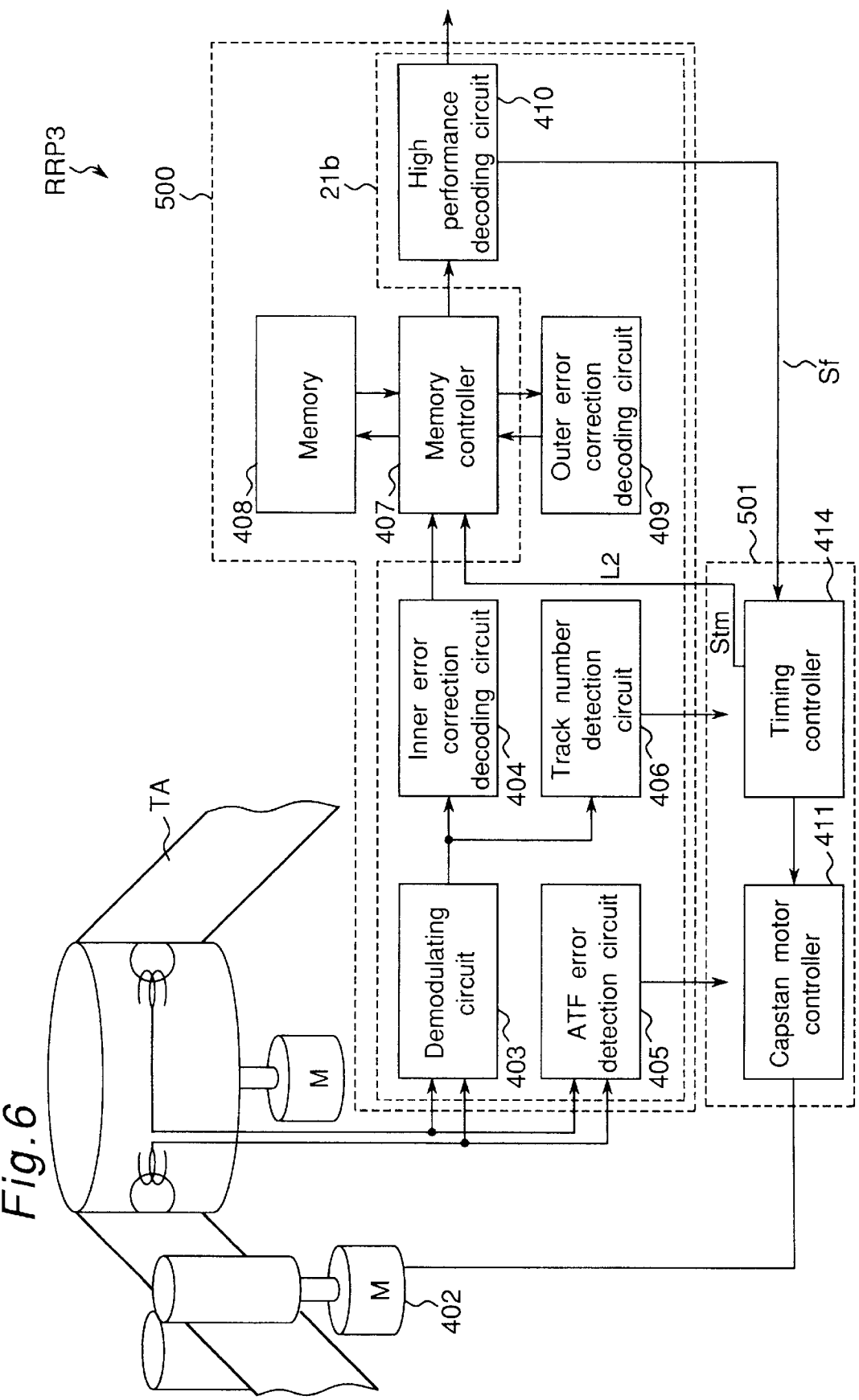
FIG. 6 is a block diagram showing a digital recording and reproducing apparatus according to a third embodiment of the present invention.

Referring to FIG. 6, a digital recording and reproducing apparatus RRP3 according to a third embodiment of the present invention is shown. This recording and reproducing apparatus RRP3 includes the magnetic tape TA, a signal processing circuit 500, a micro control unit 501, an external expansion bus L2, and a capstan motor 402.

The micro control unit 501 is similarly constructed to the micro control unit 1 shown in FIG. 1, and is connected to the signal processing circuit 500 by the external expansion bus L2 substantially the same as the external expansion bus 5 of FIG. 1. However, the micro control unit 501 further includes a capstan controller 411 for controlling the capstan motor 402 and a timing controller 411.

The signal processing circuit 500 has a demodulating circuit 403, an inner error correction decoding circuit 404, an ATF error detection circuit 405, a track number detection circuit 406, a memory controller 407, a memory unit 408 with capacity sufficient to store at least m×2 frames of reproduction data, an outer error correction decoding circuit 409, and a high performance decoding circuit 410 for outputting the reference frame signal Sf to a timing controller 414 of the micro control unit 401. The memory 408 is similarly constructed to the memory 205 of FIG. 2, wherein the external expansion bus interface circuit of the present invention is incorporated.

The timing controller 414 is connected to the memory 408 by the external expansion bus L2 though the external expansion bus interface circuit incorporated therein for transmitting the timing signal Stm. The timing controller 414 detects the phase error between the frame phase of the reproduction signal and the reference frame based on the reference frame signal Sf and the reproduction track to control the timing, and the frame reference signal Stm output from the timing controller 414. The capstan controller 411 is connected to the ATF error detection circuit 405, and is further connected to the capstan motor 402.

When tape reproduction begins the reproduction data reproduced from the magnetic tape TA is input to the demodulating circuit 403 and error detection circuit 405. The demodulating circuit 403 demodulates the reproduction data and outputs to the inner error correction decoding circuit 404 and track number detection circuit 406. The error detection circuit 405 detects the synchronization error in the reproduction data, and sends an error signal to the capstan motor controller 411. Based on this error signal, the capstan motor controller 411 synchronizes tape travel by track unit.

Simultaneously to this operation of the capstan motor controller 411, the inner error correction decoding circuit 404 applies error correction decoding to the demodulated reproduction data and outputs to the memory controller 407. The memory controller 407 stores the reproduction data to the memory unit 408.

After track synchronization is accomplished, the timing controller 414 detects the phase difference between the frame phase of the reproduction signal and the reference frame signal Sf based on the track number output from the track number detection circuit 406 and the reference frame signal Sf output from the decoding circuit 410. If a phase difference is detected, a frame phase different from the reference frame signal Sf is set to the outer error correction decoding circuit 409 based on the phase difference, and output as the frame reference signal Stm. The outer error correction decoding circuit 409 then applies track unit correction decoding to the reproduction data stored to the memory unit 408 based on the reference frame signal Stm. The decoding circuit 410 then selects in track units m frames of the reproduction data stored in the memory unit 408 for which the outer correction decoding has been completed, outputs the data from the memory unit 408, applies high efficiency decoding, and outputs the decoded signal.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. An external expansion bus interface circuit for connecting a peripheral to a micro control unit to exchange digital information under an external expansion memory mode of said micro control unit, said circuit comprising:

memory means for storing a data; and address decoding means for receiving said data, an address strobe, and a write strobe from said micro control unit to produce an enable signal for enabling said memory means to store said data at address designated said data.

2. A digital recording and reproducing apparatus exchanging digital information between a peripheral and a micro control unit under an external expansion memory mode thereof, said apparatus comprising:

external expansion bus interface circuit for connecting said micro control unit to said peripheral under an external expansion memory mode comprising:
first memory means for storing a data; and
address decoding means for receiving said data, an address strobe, and a write strobe from said micro control unit to produce an enable signal for enabling said memory means to store said data at address designated said data;

second memory means for storing said digital information.

* * * * *